United States Patent Office 3,393,044
Patented July 16, 1968

3,393,044
PROCESS FOR THE MANUFACTURE OF MONO-ALKALI METAL PHOSPHATES
Ruth Blumberg, Avraham Matitiahu Baniel, and Pnina Melzer, Haifa, Israel, assignors to Israel Mining Industries-Institute for Research and Development, Haifa Bay, Israel, an Israel company
No Drawing. Filed Jan. 26, 1965, Ser. No. 428,223
Claims priority, application Israel, Mar. 30, 1964, 21,072
19 Claims. (Cl. 23—107)

ABSTRACT OF THE DISCLOSURE

Mono-alkali metal phosphates are manufactured in improved yield by reacting approximately 1 molar part of an alkali metal chloride or ammonium chloride with approximately 2 molar parts of aqueous phosphoric acid at a temperature not above about 180° C. in the presence of vapors of an organic solvent having a boiling point at the given pressure which is above that of an azeotropic mixture of hydrogen chloride and water at the same pressure, and which solvent is not decomposed by and does not react with the reagents or the reaction products.

---

This invention concerns the manufacture of mono-alkali metal orthophosphates by the reaction of aqueous phosphoric acid with an alkali metal chloride. These salts have various uses, e.g. as fertilizers (especially the potassium and ammonium salts), and as starting materials for the manufacture of polyphosphates (especially the potassium and sodium salts) which are used as ingredients in detergent preparations.

In connection with this invention the term "alkali metal" is to be understood as including the ammonium radical.

In view of the fact that alkali metal chlorides and technical-grade or commercial-grade phosphoric acid (of concentrations of about 40 to 90% by weight) are readily available reagents, many processes have already been suggested for the production of mono-alkali metal phosphates by the direct reaction of these reagents at a temperature at which the liberated hydrochloric acid is evaporated, but their yield has been low and they have encountered other difficulties so that no commercially worthwhile process could be developed so far on the basis of this direct reaction. If the reagents are used in the molar proportion 1:1 corresponding to the stoichiometric relationship postulated by the reaction scheme

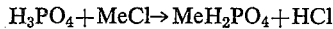

$$H_3PO_4 + MeCl \rightarrow MeH_2PO_4 + HCl$$

where Me is an alkali metal, no higher yield than about 40% of the theoretical yield can be achieved even at a temperature of 180° C., which is practically the upper limit of admissible reaction temperatures since at higher temperatures some of the phosphate is converted into metaphosphate or polyphosphate. The yield can be increased if an excess of phosphoric acid is used corresponding to an acid:chloride molar ratio of 2:1 or even 3:1, but even so no complete reaction is achieved at a temperature of up to 180° C.

These drawbacks and difficulties are eliminated, and a high yield of mono-alkali metal phosphate is achieved, by the process according to the invention which is equally based on the direct reaction of an alkali metal chloride with aqueous phosphoric acid.

The invention consists in a process for the manufacture of mono-alkali metal phosphates, wherein about two molar parts of aqueous phosphoric acid are reacted at a temperature not above 180° C. with about one molar part of an alkali metal chloride in the presence of vapours of an organic solvent whose boiling point at the given pressure is above that of an azeotropic mixture of hydrogen chloride and water at the same pressure and which is not decomposed by and does not react with the reagents nor with the reaction products.

The preferred reaction temperature range is from about 120 to about 160° C. The operation may be carried under atmospheric or reduced pressure.

The molar ratio phosphoric acid:chloride need not be exactly 2:1. In some cases the use of an excess of phosphoric acid may appear to be advantageous, in other cases an excess of chloride may be advisable, especially for reasons of economy.

The solvent may be admixed in the liquid state to the reaction mixture and be evaporated by the application of external heat to the mixture; instead, the solvent may be heated and evaporated in a vessel separate from the reaction mixture and the vapours be contacted with the mixture.

Where the solvent is admixed in liquid form to the reaction mixture this can be done in various ways. For example, in a batch operation the entire amount of solvent needed for carrying the process through to termination may be added from the outset; or else, a small amount of solvent may be added initially and make-up amounts will be introduced in the course of the reaction in larger or smaller portions, even drop-wise, and this make-up solvent may be derived from fresh stock or from recycled distillate.

The generation of the solvent vapours separately from the reaction mixture is advantageous in the continuous performance of the process according to the invention. For example, a stream of solvent vapour may be conducted in countercurrent to the reaction mixture feed. In appropriate cases the sensible and latent heat of the solvent vapours may be the only source of heat for warming the reagents up to the reaction temperature and maintaining the latter; in other cases extraneous heating may, in addition, be resorted to. In either case the solvent vapours may be either saturated or super-heated.

Solvents suitable for use in this process are, for example, aliphatic hydrocarbons such as kerosene, white spirit, n-octane; certain aliphatic ethers such as n-butyl ether (B. P. 142° C.), sec. butyl ether (B.P. 121° C.) and iso-amyl ether (B.P. about 170° C.); and chlorinated hydrocarbons such as tetrachloroethane (B.P. 146° C.) and tetrachloroethylene (B.P. 121° C.).

In the process according to the invention, a high proportion of the alkali metal chloride can be converted into mono-alkali metal phosphate, and this at a considerably lower reaction temperature than has been required hitherto for this type of process. At this lower temperature there is virtually no formation of metaphosphate or polyphosphate.

After the removal of liquid solvent remaining, or formed by condensation, in the reaction mixture the latter consists of about equal molar proportions of mono-alkali metal phosphate and phosphoric acid. In the case of potassium and sodium there forms, on cooling, in crystalline form the known double compound

$$MeH_2PO_4 \cdot H_3PO_4$$

(Me=potassium or sodium) which can be decomposed in various known ways, or, in accordance with the present invention, by extractive digestion with partially water-miscible solvents, e.g. aliphatic alcohols such as butyl or amyl alcohol. These solvents dissolve the phosphoric acid component and leave the mono-phosphate component behind. In the case of mono-ammonium phosphate, it has not yet been definitively established whether the residue is the same kind of double compound or rather a mutual dispersion of the two components, but in any case it can be separated into its components in the same way as can the double compounds aforesaid.

For certain purposes, e.g. for use as fertilizers, the mixture or double compound of mono-alkali metal phosphate and phosphoric acid need not be separated but can be further processed as such. For example, it may be treated with ammonia, whereby a combined nitrogen-potassium-phosphorus fertilizer can be manufactured. For example, a useful proportion of ammonia to be added would be such as to add 1.5 molecular parts of ammonia to 1 molecular part of the mixture or double compound. This operation probably leaves the mono-alkali phosphate component largely unaffected and adds the ammonia to the phosphoric acid component.

The invention is illustrated by the following examples to which it is not limited.

Example 1

A mixture of 112 g. (1.5 mole) of potassium chloride, 450 g. of technical-grade wet-process phosphoric acid of 65% strength $H_3PO_4$ (3 moles, calculated as 100% $H_3PO_4$) and 25 ml. of n-octane (B.P. 124.8° C.) is heated to boiling in a distilling flask connected to a descending condenser and provided with a dropping funnel. At 112° C. a mixture of aqueous hydrochloic acid and n-octane starts distilling. The distillate is condensed and the octane separated from the aqueous hydrochloric acid and returned to the dropping funnel of the distilling flask, from which it is gradually recycled to the boiling mixture. As the boiling temperature rises to 124° C., the concentration of the hydrochloric acid rises from the original 13.4% to a final 26.2%. When the boiling temperature has risen to 126° C., no more hydrochloric acid is formed in the distillate.

The residue then consists of a top phase of liquid n-octane and a liquid bottom phase constituted by the double component $KH_2PO_4 \cdot H_3PO_4$, which contains about 95% of the potassium chloride used as a starting material. The undecomposed about 5% of potassium chloride remains dissolved in the bottom phase. The latter solidifies in crystalline form on cooling.

The bottom phase is separated from the solvent phase and, either still liquid or after solidification, decomposed by being extracted with butyl alcohol, which dissolves the liberated phosphoric acid while the monopotassium phosphate and residual potassium chloride remain as a solid residue. The potassium chloride can be removed by washing with a small amount of water, which leaves the monopotassium phosphate mainly undissolved.

Example 2

The process is carried out as described in Example 1, with the following alterations:

(a) Composition of reaction mixtures: 149 g. (2 moles) of potassium chloride, 560 g. of 70% ($H_3PO_4$) wet-process technical-grade phosphoric acid (corresponding to 4 moles of $H_3PO_4$), 40 ml. of n-butyl ether (B.P. 142° C.);

(b) Boiling range of reaction mixture from 110° C. to 142° C.

(c) Yield: 94.5% conversion of KCl.

Results similar to those obtained in accordance with Examples 1 or 2 can be achieved by the use, as a solvent, of a white spirit fraction of boiling range of 126–165° C., or of n-decane (B.P. 174° C.).

Example 3

The process is carried out in a continuous manner with the aid of a packed glass column of 70 cm. height and 5 cm. inner diameter, thermally insulated by a ceramic mantle. No external heating is applied.

A 2:1 molar mixture of 63% ($H_3PO_4$) wet-process technical-grade phosphoric acid (calculated as 100% $H_3PO_4$) and potassium chloride is fed to the top of the column at the rate of 1.16 kg./hr. To the bottom of the column vapours of white spirit (boiling range 140–160° C.) are supplied from a vessel where the solvent is heated to boiling, at the rate of 15 kg./hr. A portion of the solvent vapours condenses continuously in the column and supplies the heat required for heating the reaction mixture. At the bottom of the column a two-phase mixture of the double compound $KH_2PO_4 \cdot H_3PO_4$ in the liquid state and of condensed solvent is withdrawn. This is further processed as described in Example 1. At the top a mixture of solvent vapours and evaporated aqueous hydrochloric acid is discharged. These vapours are condensed, the solvent is separated from the aqueous liquid and returned to the process. The aqueous hydrochloric acid has an average concentration of 26 to 27%.

The rate of conversion of KCl to $KH_2PO_4$ is above 95%.

Substantially the same result is achieved by the use, instead of white spirit, of n-butyl ether (B.P. 142° C.) or of iso-amyl ether (B.P. 172° C.).

Example 4

Mono-sodium phosphate is prepared, in the manner described in Example 1, from a reaction mixture containing 58.5 g. (1 mole) of sodium chloride, 300 g. of 65% ($H_3PO_4$) wet-process technical-grade phosphoric acid (2 moles calculated as $H_3PO_4$) and 30 ml. of iso-amyl ether (B.P. 172° C.). The boiling temperature of the mixture is about 135° C. The rate of conversion of sodium chloride is about 96%.

Example 5

A reaction mixture composed of 53.5 g. (1 mole) of ammonium chloride and 310 g. of 63% ($H_3PO_4$) wet-process technical grade phosphoric acid (2 moles calculated as $H_3PO_4$) is introduced into an upright glass tube of 60 cm. height and 5 cm. inner diameter, provided with a porous sintered glass bottom. A kerosene fraction of boiling range of 140–150° C. is brought to boiling in a separate vessel and 1200 g. of the vapour is introduced into the reaction mixture in the tube through the sintered bottom. The temperature of the mixure is maintained at 125–130° C. by the combined effect of external heating and the heat supplied by the kerosene vapours condensing in the reaction mixture. A mixture of kerosene vapours and evaporated aqueous hydrochloric acid is discharged at the top of the tube, collected and condensed.

The reaction is completed within about 30 mins. when about 95% of the ammonium chloride has been converted to mono-ammonium phosphate. The molar mixture of $(NH_4)H_2PO_4$ and $H_3PO_4$ thus formed is separated into its components similarly as described in Example 1 for the double compound.

What we claim is:

1. Process for the manufacture of a phosphate selected from the group consisting of a mono-alkali metal phosphate and mono-ammonium phosphate, comprising the steps of reacting about two molar parts of aqueous phosphoric acid with about one molar part of a compound selected from the groups consisting of alkali metal chlorides and ammonium chloride at a temperature between the boiling point of the reaction mixture and 180° C. and at between atmospheric and subatmospheric pressure in the presence of vapors of a water-immiscible organic solvent whose boiling point at the given pressure is above that of an azeotropic mixture of hydrogen chloride and water at the same pressure and which is not decomposed by and does not react with the reagents nor with the reaction products, and recovering the phosphate product from the reaction mixture.

2. The process according to claim 1, wherein the reaction temperature is maintained in the range from about 120 to about 160° C.

3. The process according to claim 1, wherein the solvent is admixed in the liquid state to the reaction mixture and evaporated by the application of external heat to the mixture.

4. The process according to claim 1, wherein the solvent is heated and evaporated in a vessel separate from the reaction mixture and the vapours are contacted with reaction mixture.

5. The process according to claim 1, being performed in a batch operation.

6. The process according to claim 5, wherein the entire amount of solvent needed for carrying the process through to termination is added to the reaction mixture from the outset.

7. The process according to claim 5, wherein a fraction of the total required amount of solvent is initially added to the reaction mixture and additional amounts of the solvent are introduced into the reaction mixture as the reaction proceeds.

8. The process according to claim 4, being performed in a continuous manner.

9. The process according to claim 1, wherein said organic solvent is an aliphatic hydrocarbon.

10. The process according to claim 1, wherein said organic solvent is an aliphatic ether.

11. The process according to claim 1, wherein said organic solvent is a chlorinated hydrocarbon.

12. The process according to claim 1, wherein the recovery of the phosphate product from the reaction mixture includes the step of separating from the reaction mixture a liquid double compound of substantially equimolecular proportions of the phosphate product and phosphoric acid, and free phosphoric acid.

13. The process according to claim 1, wherein the recovery of the phosphate product from the reaction mixture includes the step of separating from the reaction mixture a double compound of substantially equimolecular proportions of the phosphate product and phosphoric acid.

14. The process according to claim 12 wherein bound and free phosphoric acid is removed from said double compound by liquid-liquid extraction with a partially water-miscible alcohol solvent.

15. The process according to claim 12, wherein the double compound is further processed by reacting it with ammonia.

16. The process according to claim 12, wherein bound and free phosphoric acid in said double compound is reacted with about 1.5 molecular parts of ammonia to one molecular part of combined bound and free phosphoric acid.

17. The process according to claim 13, wherein said double compound is decomposed by liquid-liquid extraction with a partially water-miscible alcohol solvent.

18. The process according to claim 13, wherein said double compound is decomposed by reaction with ammonia.

19. The process according to claim 13, wherein said double compound is reacted with a proportion of about 1.5 molecular parts of ammonia to one molecular part of said double compound.

References Cited

UNITED STATES PATENTS

| 1,805,873 | 5/1931 | Kaselitz | 23—107 |
| 1,865,968 | 7/1932 | Schuppe | 23—107 |
| 2,824,786 | 2/1958 | Merlub-Sobel | 23—107 |
| 3,328,118 | 6/1967 | Sasakura | 23—107 |

FOREIGN PATENTS

| 1,102,711 | 6/1960 | Germany. |

OSCAR R. VERTIZ, *Primary Examiner.*

L. A. MARSH, *Assistant Examiner.*